US008876051B2

(12) United States Patent
Stewart

(10) Patent No.: US 8,876,051 B2
(45) Date of Patent: Nov. 4, 2014

(54) BRIDGING SEAL

(75) Inventor: David Mark Stewart, Belfast (GB)

(73) Assignee: Airbus Operations Limited, Bristol (GB)

(*) Notice: Subject to any disclaimer, the term of this patent is extended or adjusted under 35 U.S.C. 154(b) by 552 days.

(21) Appl. No.: 13/018,537

(22) Filed: Feb. 1, 2011

(65) Prior Publication Data

US 2011/0186690 A1    Aug. 4, 2011

(30) Foreign Application Priority Data

Feb. 4, 2010   (GB) .................................. 1001834.9

(51) Int. Cl.
*B64C 9/02* (2006.01)
*B64C 7/00* (2006.01)
*B64C 3/50* (2006.01)
*B64C 1/38* (2006.01)
*B23P 17/00* (2006.01)

(52) U.S. Cl.
CPC . *B23P 17/00* (2013.01); *B64C 3/50* (2013.01); *B64C 1/38* (2013.01); *B64C 9/02* (2013.01); *B64C 7/00* (2013.01)
USPC .......................................... 244/130; 244/213

(58) Field of Classification Search
CPC ................ B64C 7/00; B64C 9/02; B64C 3/50
USPC .................. 244/130, 211, 212, 213, 215, 216
See application file for complete search history.

(56) References Cited

U.S. PATENT DOCUMENTS

| 4,120,470 | A | * | 10/1978 | Whitener ...................... 244/213 |
| 5,913,494 | A | | 6/1999 | Burbridge et al. |
| 5,941,480 | A | * | 8/1999 | Wille ............................. 244/213 |
| 6,145,791 | A | * | 11/2000 | Diller et al. .................... 244/130 |
| 6,575,407 | B2 | * | 6/2003 | McCallum et al. ........... 244/133 |
| 2006/0249627 | A1 | | 11/2006 | Hernandez |
| 2009/0267304 | A1 | * | 10/2009 | Wildman ...................... 277/345 |

FOREIGN PATENT DOCUMENTS

| DE | 2114459 | 9/1972 |
| WO | 2009043248 | 4/2009 |
| WO | 2009124832 | 10/2009 |

OTHER PUBLICATIONS

UK Search Report for GB1001834.9 mailed May 24, 2010.

* cited by examiner

*Primary Examiner* — Tien Dinh
*Assistant Examiner* — Richard R Green
(74) *Attorney, Agent, or Firm* — Lowe Hauptman & Ham, LLP

(57) ABSTRACT

A bridging seal comprising a stack of two or more layers of elastomer, the bridging seal having a first edge and a second edge opposite the first edge, adjacent layers being attached to each other at the first and second edges, wherein adjacent layers of the bridging seal have opposing surfaces and a substantial portion of the opposing surfaces is unbonded. The bridging seal may be used to seal a gap between two aerodynamic surfaces on an aircraft.

13 Claims, 4 Drawing Sheets

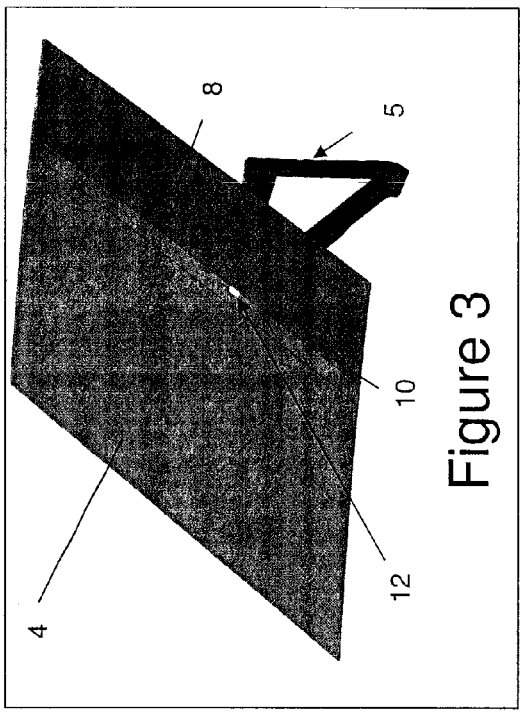
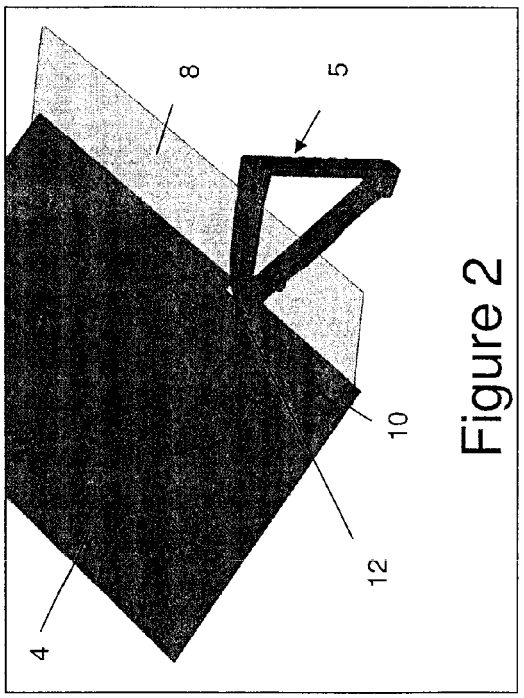
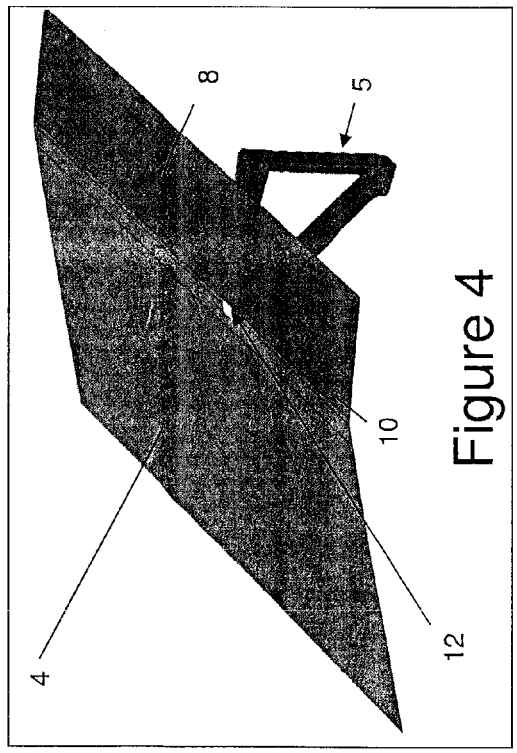

BRIDGING SEAL

RELATED APPLICATIONS

The present application is based on, and claims priority from, Great Britain Application Number 1001834.9, filed Feb. 4, 2010, the disclosure of which is hereby incorporated by reference herein in its entirety.

FIELD OF THE INVENTION

The present invention relates to a bridging seal, an aircraft assembly and a method of manufacturing an aircraft assembly.

BACKGROUND OF THE INVENTION

Spoilers are typically provided on the upper aerodynamic surface of an aircraft wing, between the main fixed wing box and the trailing edge flaps. The performance of the flaps can be improved by attaching them to the fixed wing box by drop hinge mechanisms. This allows the flaps to be deployed in both aft and downward directions and to be rotated downwardly (or "drooped"). When the flaps are fully deployed in this way, gaps are formed between the trailing edges of the spoilers and the leading edges of the flaps. Small air gaps in these regions improve lift when compared to conventional Fowler flaps. However, if these gaps are too large and the continuity of the upper aerodynamic surface is not maintained, then the performance of the flaps is reduced. To control the size of these gaps, the spoilers are rotated downwardly (or "drooped") when the flaps are fully deployed.

The spoilers are typically attached to the fixed wing box by structural ribs. However, it is necessary to prevent the leading edges of the spoilers from clashing with the structural ribs when the spoilers are deployed to their braking position. One way in which this can be done is to provide notches in the structural ribs to accommodate the deployed spoilers. However, in this configuration, the necks of the ribs are subject to increased stress concentrations which require them to be thickened. Moreover, the shroud panels which are bolted to the upper arms of the ribs must also be thickened to prevent them from fluttering in the air flow. There is therefore a weight penalty associated with this solution. The load paths are also more complex.

An alternative method of preventing clashing between the spoilers and the ribs is to provide cut-out sections in the leading edges of the spoilers. However, when the spoilers are in their cruise positions, the cut-out sections act as discontinuities in the path of the air flow, increasing drag and noise. Consequently, for the optimum performance of this type of arrangement, the cut-out sections need to be sealed, while allowing the spoilers to rotate over their entire pivotal range without clashing with the structural ribs.

SUMMARY OF THE INVENTION

A first aspect of the invention provides a bridging seal comprising two or more layers of elastomer stacked one on top of the other, the bridging seal having a first edge and a second edge opposite the first edge, adjacent layers being attached to each other at the first and second edges, wherein adjacent layers of the bridging seal have opposing surfaces and a substantial portion of the opposing surfaces is unbonded. Preferably, the bridging seal further comprises a layer positioned between adjacent elastomeric layers having a lower surface friction than the elastomeric layers.

Advantageously, adjacent layers of the bridging seal are bonded to each other at the first and second edges. Additionally or alternatively, adjacent layers of the bridging seal are attached to each other by fasteners at the first and/or second edges.

A second aspect of the invention provides an aircraft assembly comprising: a first component with a first aerodynamic surface; a second component with a second aerodynamic surface; and a bridging seal according to the first aspect of the invention bridging a gap between the two aerodynamic surfaces.

In one embodiment of the second aspect of the invention, the second component is pivotally connected to the first component. Advantageously, the bridging seal is fixed on either side of the gap directly, or indirectly, to the first and second components. Preferably, the bridging seal is fixed directly, or indirectly, to the first and second components by fasteners.

The first and second components may be a wing trailing edge shroud panel and a spoiler respectively. In this case, the shroud panel is preferably connected to a hinge fitting having a hinge point about which the spoiler is pivotally connected, and the bridging seal is fitted above the hinge point.

In one embodiment, the bridging seal extends between the trailing edge shroud panel and a cut-out section in the leading edge of the spoiler, the cut-out being provided to prevent clashing between the spoiler and the hinge fitting when the spoiler is deployed.

A third aspect of the invention provides a method of manufacturing an aircraft assembly, the aircraft assembly comprising: a first component with a first aerodynamic surface; and a second component with a second aerodynamic surface, the method comprising: bridging a gap between the two aerodynamic surfaces with a bridging seal according to the first aspect of the invention.

In one embodiment, the second component is pivotally connected to the first component.

Preferably, the method further comprises fixing the bridging seal on either side of the gap directly, or indirectly, to the first and second components.

In one embodiment, the assembly is in accordance with the second aspect of the invention.

BRIEF DESCRIPTION OF THE DRAWINGS

Embodiments of the invention will now be described with reference to the accompanying drawings, in which:

FIGS. 2-4 show the trailing edge of the wing of FIG. 1 with the spoiler in braking, cruise and drooped positions respectively;

DETAILED DESCRIPTION OF EMBODIMENT(S)

Figure 1:
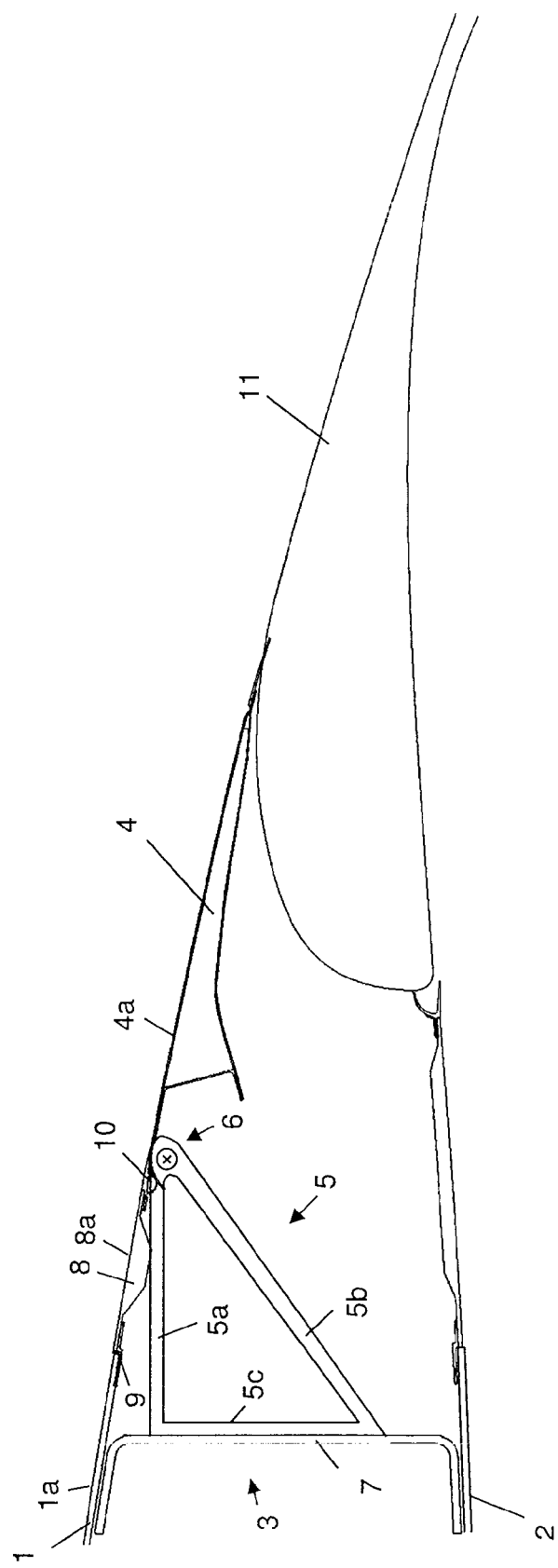
FIG. 1 is a schematic cross-sectional view through the trailing edge of an aircraft wing.

FIG. 1 is a schematic chord-wise cross sectional view through the trailing edge of an aircraft wing. The aircraft wing comprises a fixed wing box comprising upper and lower covers 1, 2 which are bolted to, and extend between, a front spar (not shown) and a rear spar 3. A spoiler 4 with a radiused leading edge is pivotally attached to a pair of structural ribs 5, one of which is shown in FIG. 1. Each rib 5 comprises an upper arm 5a, a lower arm 5b and a foot 5c. The leading edge of the upper arm 5a is joined to the upper edge of the foot 5c, while the lower arm 5b extends between, and is joined at acute angles to, the lower edge of the foot 5c and the aft edge of the upper arm 5a. A clevis hinge point 6 is formed at the join between the upper and lower arms 5a, 5b. The upper arm 5a is also bolted to a trailing edge shroud panel 8. The trailing edge shroud panel 8 is attached to the upper cover 1 by a butt-strap 9, and the upper surface 8a of the panel 8 forms a continuous aerodynamic surface with the upper surface 1a of the upper cover 1. A flexible wedge seal 10, which is fastened to the shroud panel 8, is fitted across the span of the leading edge of the spoiler on either side of the clevis hinge point 6 to seal an air gap between the radiused leading edge of the spoiler 4 and the aft edge of the panel 8. A flap 11 is positioned directly aft of the spoiler 4. The flap 11 is pivotally attached to the wing box by a drop-hinge mechanism (not shown).

As illustrated most clearly in FIGS. 2-4, the spoiler 4 can be pivoted about a relatively wide pivotal range. FIG. 3 shows the spoiler 4 in its cruise (or retracted) position, where it is substantially parallel to the shroud panel 8. For example but not exclusively, relative to the cruise position shown in FIG. 3, the spoiler may be pivoted anticlockwise about an angle of up to −15° to a drooped position (see FIG. 4). In this position, as described above in the Background section, the drooped spoiler controls an air gap between the spoiler trailing edge and the leading edge of the flap 11 to ensure that high lift is achieved. Additionally, the spoiler 4 may be pivoted clockwise about an angle of up to +55° (again relative to the position shown in FIG. 3) to a braking position (see FIG. 2). In this position, the spoiler significantly reduces lift and also increases drag.

In FIGS. 2-4, the wedge seal 10, which extends between the aft edge of the panel 8 and the leading edge of the spoiler 4, is shown schematically as a single part with the panel 8. The wedge seal 10 is biased towards the spoiler 4 such that the air gaps between the leading edge of the spoiler 4 and the trailing edge of the shroud panel 8 on either side of the clevis hinge point 6 are sealed throughout the entire pivotal range of the spoiler 4. Note that, although the wedge seal 10 terminates on either side of the clevis hinge point 6, this is not shown in the schematic views of FIGS. 2-4.

In order to allow the spoiler to be deployed to the braking position without clashing with the clevis hinge point 6, a cut-out section 12 is formed in the leading edge of the spoiler 4. When deployed to this position (see FIG. 2), the cut-out section 12 is partially filled by the clevis hinge point 6. However, in the spoiler cruise position shown in FIG. 3, the cut-out section 12 acts as a discontinuity in the upper aerodynamic surface of the wing which creates unwanted drag and noise. In the spoiler drooped position shown in FIG. 4, as the radiused leading edge is pivoted downwards, the cut-out section 12 becomes fully exposed to the air flow.

Figure 5:
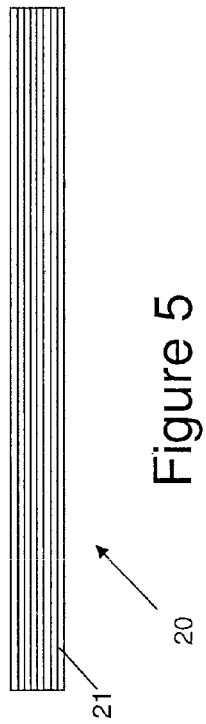
FIG. 5 is a close-up side view of a laminated seal.

FIG. 5 shows a bridging seal 20 which comprises a stack of eight layers 21 of elastomer. Each pair of adjacent layers 21 has a corresponding pair of opposing surfaces. Each pair of opposing surfaces is unbonded. Thinner layers of elastomer have a lower bend radius than thicker layers of the same material. Moreover, by not bonding adjacent layers together, the layers 21 of the seal 20 can bend relative to each other. Therefore, as a whole, the layered seal 20 has a significantly lower bend radius than a bonded (or non laminated) seal of the same overall thickness. The layered bridging seal 20 is thus extremely flexible and durable.

As the layers 21 of the seal are stacked one on top of the other in an orderly pile, a substantial portion of each pair of opposing surfaces is in physical contact. Thus, each layer 21 (other than the bottom layer) is supported by the layer beneath it in the stack.

As shown in FIG. 5, each layer 21 is substantially planar. Each layer is also substantially uniform. That is, each layer 21 has: a substantially uniform thickness; a substantially uniform shape; and a substantially uniform material composition.

FIG. 5 shows the bridge seal 20 in its relaxed state. Although each individual layer 21 of elastomer will be compressible to a small degree, the seal 20 as a whole has a thickness which is substantially incompressible. This substantially incompressible thickness makes the seal 20 particularly suitable for applications in which it forms an external aerodynamic surface (of an aircraft or a car, for example). This is because the seal will not collapse under aerodynamic forces and will thus maintain a desired external aerodynamic profile.

Although illustrated in FIG. 5 as an eight layered elastomeric seal, it is noted that the bridging seal 20 may comprise any number of layers. Preferably, the seal has three or more layers. This provides both high flexibility and a high material density. A high material density increases the strength of the seal per unit volume which allows it to be used in applications (see below, for example) where high strength is required but space is limited.

Figure 6:
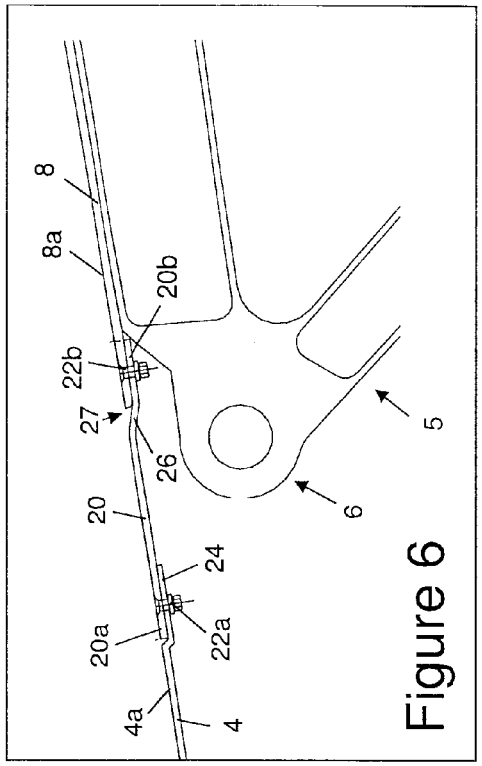
FIGS. 6-8 are close-up side views of the seal of FIG. 5 in use, connected between the spoiler and the trailing edge shroud panel with the spoiler in its cruise (retracted), braking and drooped positions respectively.
Figure 7:
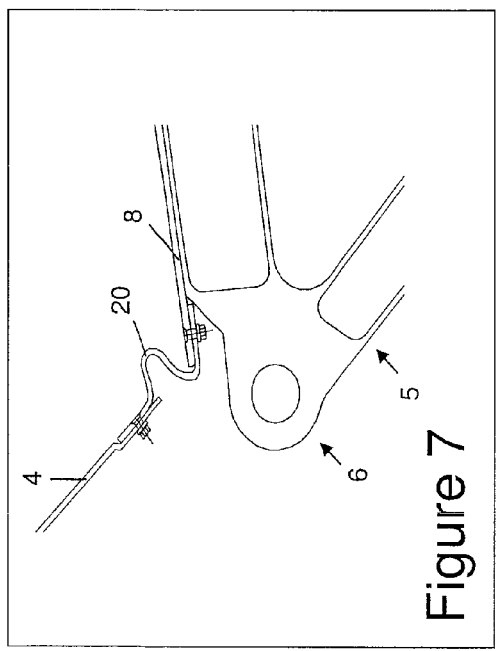
Figure 8:
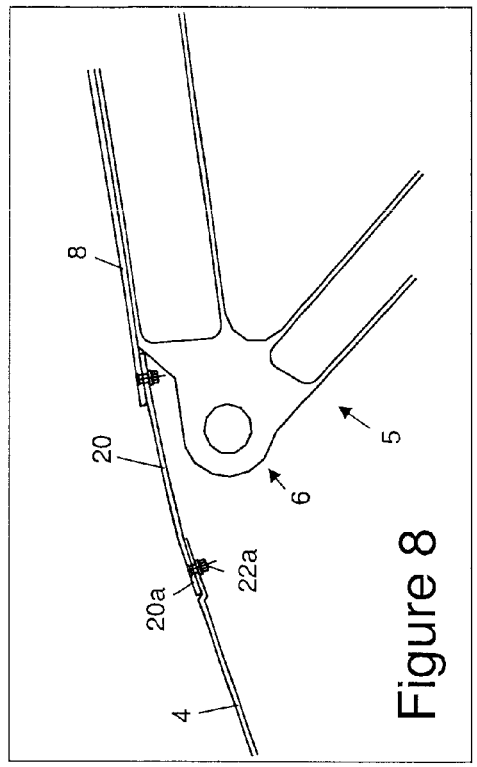

FIGS. 6-8 show the bridging seal 20 in use on the aircraft wing of FIGS. 1-4. As indicated above, the cut-out section 12 in the leading edge of the spoiler 4 creates a gap between the spoiler 4 and the shroud panel 8 above the clevis hinge point 6. In the example shown in FIGS. 6-8, the bridging seal 20 extends between the aft edge of the shroud panel 8 and the leading edge of the spoiler 4 to seal this gap. The bridging seal 20 has a first distal end 20a which is attached by a counter-sunk fastener 22a to the upper surface of a seat 24, which extends in a forward chord-wise direction from the leading edge of the spoiler 4, such that the bridging seal 20 is substantially flush with the upper aerodynamic surface 4a of the spoiler 4. The bridging seal 20 also has a second distal end 20b which is attached by a counter-sunk fastener 22b to the underside of the shroud panel 8 where it overhangs the upper arm 5a of the hinge rib 5. This configuration causes a kink 26 to form in the seal 20 when the spoiler 4 is in the cruise (or retracted) position as shown in FIG. 6.

As the bridging seal 20 is fastened at both distal ends 20a, 20b, when the spoiler 4 is in the cruise position, the bridging seal 20 is held in place by membrane forces to form a substantially continuous aerodynamic surface between the aft edge of the shroud panel 8 and the leading edge of the spoiler 4. The seal 20 thus either partially or fully eliminates the drag and noise effects that would otherwise be created by the cut-out section 12 when the spoiler 4 is in the cruise position. The membrane forces created in the seal 20 by the fasteners 22a, 22b remove the need for the seal 20 to have a significant bending stiffness in order to avoid flutter.

Due to the presence of the kink 26 when the spoiler 4 is in the cruise position, a small discontinuity 27 may remain between the seal 20 and the aft edge of the shroud panel 8. In order to ensure that a continuous aerodynamic surface is formed between the aerodynamic surface 8a of the panel 8 and the aerodynamic surface 4a of the spoiler 4, an aerodynamic filler may be added to fill this discontinuity 27. Alternatively, the trailing edge of the panel 8 may be bevelled.

As the bridging seal 20 comprises a plurality of unbonded layers, when the spoiler 4 is deployed to its braking position as shown in FIG. 7, the clockwise rotation (relative to the view of FIG. 7) of the spoiler 4 causes the layers 21 of the seal 20 to bend relative to each other. Due to the high flexibility of the seal 20, the spoiler 4 can be deployed fully to its braking position without significant bending resistance from the bridging seal 20 and without causing excessive stresses and strains on the seal 20.

In order to minimise frictional forces between adjacent layers 21 of the bridging seal 20 when they bend relative to one another, additional layers of a material (such as PTFE) with a lower surface friction than that of the layers of elastomer may be interleaved between the layers of elastomer. Additionally or alternatively, the layers 21 of elastomer may be smoothed prior to installation of the bridging seal 20 to minimise their own surface friction.

When the spoiler 4 is deployed to its drooped position as shown in FIG. 8, the movement of the spoiler 4 causes the layers 21 of the seal 20 to become stretched. As the spoiler 4 droops downwards with respect to the shroud panel 8, the kink 26, which is present when the spoiler 4 is in the cruise position (see FIG. 6), is pulled down substantially into alignment with the remainder of the bridging seal 20. The kink 26 effectively provides a length of additional material which allows the bridging seal 20 to expand sufficiently when the spoiler 4 is fully drooped without significantly resisting the movement of the spoiler 4 and without exerting excessive expansion stresses and strains on the layers 21 of the seal 20. As an alternative to providing a kink 26 in the seal 20, the fastener 22b may be a sliding fastener which is slidable along the length of the shroud panel 8 in response to movement of the spoiler 4.

It is noted that, rather than being attached directly to the leading edge of the spoiler 4 and the trailing edge of the shroud panel 8, the bridging seal 20 may be attached indirectly thereto. For example, the second distal end 20b of the bridging seal 20 may be fastened to the upper arm 5a of the hinge rib 5 which is in turn attached to the shroud panel 8.

Figure 9:
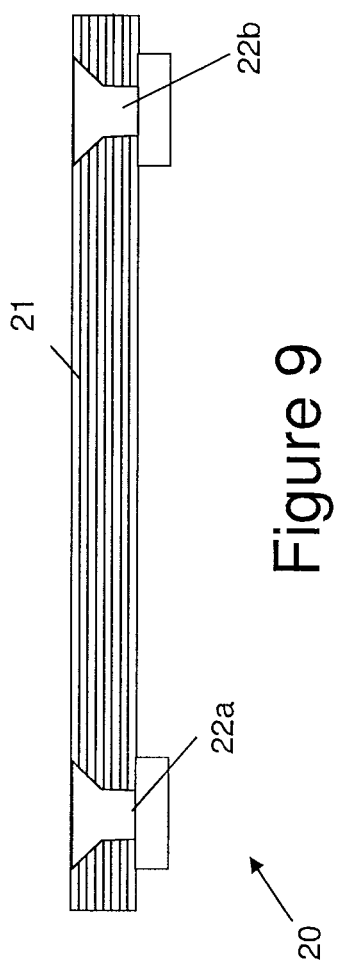
FIG. 9 is a close-up side view of the seal of FIG. 5 with countersunk fasteners pre-installed.

It is further noted that, as illustrated in FIG. 9, the seal 20 may be supplied with the countersunk fasteners 22a, 22b already installed at its distal ends 20a, 20b. In this case, during installation, the fasteners 22a, 22b are unfastened to allow the seal 20 to be accurately positioned on the respective aircraft components 8, 24. The fasteners 22a, 22b are then refastened to secure the seal 20 to the aircraft components 8, 24 as before. By pre-installing the fasteners, the seal 20 (i.e. the layers 21 of elastomer and the fasteners 22a, 22b) can be supplied as a single part.

Figure 10:
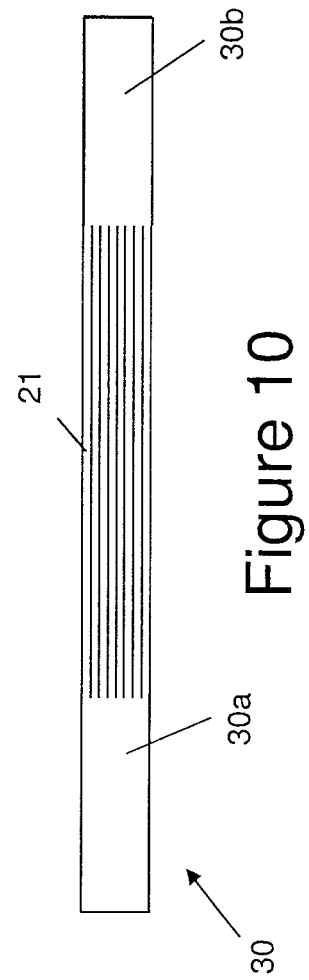
FIG. 10 is a close-up side view of an alternative seal.

An alternative bridging seal 30 is shown in FIG. 10. The alternative bridging seal 30 is similar to bridging seal 20 described above and identical reference numerals will be used for identical features. Opposing faces of adjacent layers 21 of the alternative bridging seal 30 are bonded together at its first and second distal ends 30a, 30b. However, a substantial portion of each pair of opposing faces remains unbonded along the length of the seal 30 between its first and second distal ends 30a, 30b. The unbonded portions of the layers 21 retain their ability to bend relative to each other. As explained above with respect to the bridging seal 20, this provides the bridging seal 30 with sufficient flexibility and durability to allow the spoiler to fully deploy without significant bending resistance from the bridging seal. By bonding together the layers 21 of the seal 30 at its distal ends 30a, 30b, the seal 30 can be provided as a single part. Installation of the seals 30 is also simplified as it is not necessary for the layers 21 to be manually stacked before the seal is mounted to the respective structures.

Alternatively, the alternative bridging seal 30 may be formed by cutting slits along the length of a solid elastomeric block between first and second distal ends 30a, 30b which remain uncut. This process achieves substantially the same result as bonding layers 21 of elastomer together at only their distal ends. In particular, as before, unbonded layers 21 are formed between the distal ends 30a, 30b which provide the seal 30 with sufficient flexibility and durability to allow the spoiler to fully deploy without producing significant bending resistance.

As well as being used to seal the cut-out section 12 in the leading edge of the spoiler 4, the seals 20, 30 may also be used to seal any other gap between two aerodynamic surfaces on an aircraft. For example, but not exclusively, the bridging seals 20, 30 may be used to seal a cut-out section on an aircraft landing gear bay door.

Although the invention has been described above with reference to one or more preferred embodiments, it will be appreciated that various changes or modifications may be made without departing from the scope of the invention as defined in the appended claims.

The invention claimed is:

1. An aircraft assembly comprising:
   a first component with a first aerodynamic surface;
   a second component with a second aerodynamic surface; and
   a bridging seal bridging a gap between the two aerodynamic surfaces, the bridging seal comprising two or more layers of elastomer stacked one on top of the other, the bridging seal having a first edge and a second edge opposite the first edge, adjacent layers being attached to each other at the first and second edges, wherein adjacent layers of the bridging seal have opposing surfaces and a substantial portion of the opposing surfaces is unbonded.

2. The aircraft assembly of claim 1 further comprising a layer positioned between adjacent elastomeric layers having a lower surface friction than the elastomeric layers.

3. The aircraft assembly of claim 1 wherein adjacent layers of the bridging seal are bonded to each other at the first and second edges.

4. The aircraft assembly of claim 1 wherein adjacent layers of the bridging seal are attached to each other by fasteners at the first and/or second edges.

5. The assembly of claim 1 wherein the second component is pivotally connected to the first component.

6. The assembly of claim 1 wherein the bridging seal is fixed on either side of the gap directly, or indirectly, to the first and second components.

7. The assembly of claim 6 wherein the bridging seal is fixed directly, or indirectly, to the first and second components by fasteners.

8. The assembly of claim 1 wherein the first and second components are a wing trailing edge shroud panel and a spoiler respectively.

9. The assembly of claim 8 wherein the shroud panel is connected to a hinge fitting having a hinge point about which the spoiler is pivotally connected, and the bridging seal is fitted above the hinge point.

10. The assembly of claim 9 wherein the bridging seal extends between the trailing edge shroud panel and a cut-out section in the leading edge of the spoiler, the cut-out being provided to prevent clashing between the spoiler and the hinge fitting when the spoiler is deployed.

11. A method of manufacturing an aircraft assembly, the aircraft assembly comprising:
    a first component with a first aerodynamic surface; and a second component with a second aerodynamic surface, the method comprising:

bridging a gap between the two aerodynamic surfaces with a bridging seal comprising two or more layers of elastomer stacked one on top of the other, the bridging seal having a first edge and a second edge opposite the first edge, adjacent layers being attached to each other at the first and second edges, wherein adjacent layers of the bridging seal have opposing surfaces and a substantial portion of the opposing surfaces is unbonded.

12. The method of claim 11 wherein the second component is pivotally connected to the first component.

13. The method of claim 11 further comprising fixing the bridging seal on either side of the gap directly, or indirectly, to the first and second components.

* * * * *